US011050167B2

(12) United States Patent
Yurievich et al.

(10) Patent No.: US 11,050,167 B2
(45) Date of Patent: Jun. 29, 2021

(54) ANTENNA ARRAY AND OPERATION METHOD OF ANTENNA ARRAY

(71) Applicant: Samsung Electronics Co., Ltd., Suwon-si (KR)

(72) Inventors: Nikishov Artem Yurievich, Kolomna (RU); Evtyushkin Gennadiy Aleksandrovich, Moscow (RU); Vilenskiy Artem Rudolfovich, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

(21) Appl. No.: 16/375,977

(22) Filed: Apr. 5, 2019

(65) Prior Publication Data

US 2019/0326686 A1 Oct. 24, 2019

(30) Foreign Application Priority Data

Apr. 19, 2018 (RU) .......................... RU2018114495
Feb. 1, 2019 (KR) ........................ 10-2019-0013700

(51) Int. Cl.
*H01Q 21/29* (2006.01)
*H01Q 21/08* (2006.01)
*H01Q 1/32* (2006.01)
*G01S 7/03* (2006.01)

(52) U.S. Cl.
CPC ............ *H01Q 21/296* (2013.01); *G01S 7/03* (2013.01); *G01S 7/032* (2013.01); *H01Q 1/32* (2013.01); *H01Q 1/3233* (2013.01); *H01Q 21/08* (2013.01); *H01Q 21/29* (2013.01)

(58) Field of Classification Search
CPC .... H01Q 21/296; H01Q 21/08; H01Q 1/3233; H01Q 1/32; H01Q 21/29; G01S 7/032; G01S 7/03
USPC ........................................................ 343/893
See application file for complete search history.

(56) References Cited

U.S. PATENT DOCUMENTS

| 5,828,340 | A  | * | 10/1998 | Johnson ................... H01Q 1/38 343/700 MS |
| 6,809,692 | B2 | * | 10/2004 | Puente Baliarda .. H01Q 1/1271 343/711 |
| 7,362,259 | B2 |   | 4/2008  | Gottwald |
| 8,436,763 | B2 | * | 5/2013  | Wintermantel ..... G01S 13/4454 342/70 |
| 8,624,775 | B2 |   | 1/2014  | Inami et al. |
| 9,350,405 | B2 | * | 5/2016  | Zhu ........................ H04W 52/14 |

(Continued)

FOREIGN PATENT DOCUMENTS

| EP | 3 199 976 A1 | 8/2017 |
| KR | 10-2013-0072173 A | 7/2013 |

(Continued)

*Primary Examiner* — Hai V Tran
(74) *Attorney, Agent, or Firm* — NSIP Law

(57) ABSTRACT

An antenna array includes: a first antenna array including M first antenna array units, M being a natural number; a second antenna array including R×M second antenna array units, R being a natural number greater than or equal to 2; and a control circuit configured to control the first antenna array and the second antenna array to generate radiation patterns. Each of the first antenna array units includes R×N first antenna elements, N being a natural number. Each of the second antenna array units includes N second antenna elements.

19 Claims, 10 Drawing Sheets

(56) References Cited

U.S. PATENT DOCUMENTS

| | | | |
|---|---|---|---|
| 9,541,639 B2 | 1/2017 | Searcy et al. | |
| 2007/0194991 A1* | 8/2007 | Mohamadi | H01Q 21/062 |
| | | | 343/700 MS |
| 2008/0150799 A1* | 6/2008 | Hemmi | H01Q 13/085 |
| | | | 342/361 |
| 2012/0194385 A1* | 8/2012 | Schmidt | H01Q 3/28 |
| | | | 342/368 |
| 2014/0009347 A1* | 1/2014 | Bertin | H01Q 21/24 |
| | | | 343/725 |
| 2015/0222013 A1* | 8/2015 | Choi | H04B 7/02 |
| | | | 343/879 |
| 2016/0285172 A1 | 9/2016 | Kishigami et al. | |
| 2017/0309997 A1 | 10/2017 | Alland et al. | |

FOREIGN PATENT DOCUMENTS

| | | |
|---|---|---|
| KR | 10-2015-0103547 A | 9/2015 |
| WO | WO 2016/142281 A1 | 9/2016 |

\* cited by examiner

US 11,050,167 B2

ANTENNA ARRAY AND OPERATION METHOD OF ANTENNA ARRAY

CROSS-REFERENCE TO RELATED APPLICATIONS

This application claims the benefit under 35 USC § 119(a) of Russian Patent Application No. 2018114495 filed on Apr. 19, 2018 in the Russian Federal Service for Intellectual Property and Korean Patent Application No. 10-2019-0013700 filed on Feb. 1, 2019 in the Korean Intellectual Property Office, the entire disclosures of which are incorporated herein by reference for all purposes.

BACKGROUND

1. Field

The following description relates to an antenna array and an operation method of the antenna array.

2. Description of Related Art

A typical radar sensor used, for example, in a vehicle, a robot, and the like may require high resolution sensing not only in a horizontal direction but also in a vertical direction in order to detect a plurality of objects. However, a number of transceivers may increase for the high resolution sensing, which may lead to restrictions on a device design. In addition, different designs may be required for each application of a device. Also, with respect to a linear antenna array, there is a problem that a received signal is tapered and is sensitive to a manufacturing process.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an antenna array includes: a first antenna array including M first antenna array units, M being a natural number; a second antenna array including R×M second antenna array units, R being a natural number greater than or equal to 2; and a control circuit configured to control the first antenna array and the second antenna array to generate radiation patterns. Each of the first antenna array units includes R×N first antenna elements, N being a natural number. Each of the second antenna array units includes N second antenna elements.

Each of the first antenna array units and the second antenna array units may be connected to a corresponding independent port of the control circuit.

The control circuit may be further configured to generate the radiation patterns through an on-off control of the independent port.

The control circuit may be further configured to generate the radiation patterns through an in-phase connection control of the independent port.

The control circuit may be further configured to control one first antenna array unit, among the first antenna array units, and two second antenna array units, among the second antenna array units, to generate a tapered virtual antenna array unit.

R may be 2, and the virtual antenna array unit may include 4N−1 virtual antenna elements.

An aperture size of the first antenna array unit may be twice an aperture size of the second antenna array unit.

Distances between adjacent first antenna elements, among the first antenna elements, may be equal to one another, and distances between adjacent second antenna elements, among the second antenna elements, may be equal to one another The first antenna array units and the second antenna array units may include monopole antennas.

One of the first antenna array and the second antenna array may be a transmitting antenna, and the other of the first antenna array and the second antenna array may be a receiving antenna.

Each of the first antenna elements and the second antenna elements may be disposed on a printed circuit board (PCB).

Each of the first antenna elements and the second antenna elements is formed as a patch or a slot.

The first antenna array and the second antenna array may include linear antenna arrays.

The first antenna array units and a second antenna array units may be arranged in an elevation direction to perform elevation-directional scanning.

In another general aspect, an operation method of an antenna array includes: receiving a user input; and controlling a first antenna array and a second antenna array to generate radiation patterns corresponding to the user input. The first antenna array includes M first antenna array units, M being a natural number. The second antenna array includes R×M second antenna array units, R being a natural number greater than or equal to 2. Each of the first antenna array units includes R×N first antenna elements, N being a natural number. Each of the second antenna array units includes N second antenna elements.

Each of the first antenna array units and the second antenna array units may connected to a corresponding independent port of a control circuit. The controlling may include controlling on-off operation states of the independent port based on the input, and controlling an in-phase connection of the independent port based on the input.

The controlling may include generating a tapered virtual antenna array by controlling the first antenna array and the second antenna array.

Distances between adjacent first antenna elements, among the first antenna elements, may be equal to one another, and distances between adjacent second antenna elements, among the second antenna elements, may be equal to one another.

In another general aspect, a non-transitory computer-readable storage medium stores instructions that, when executed by a processor, cause the processor to perform the method described above.

Other features and aspects will be apparent from the following detailed description, the drawings, and the claims.

Figure 1:
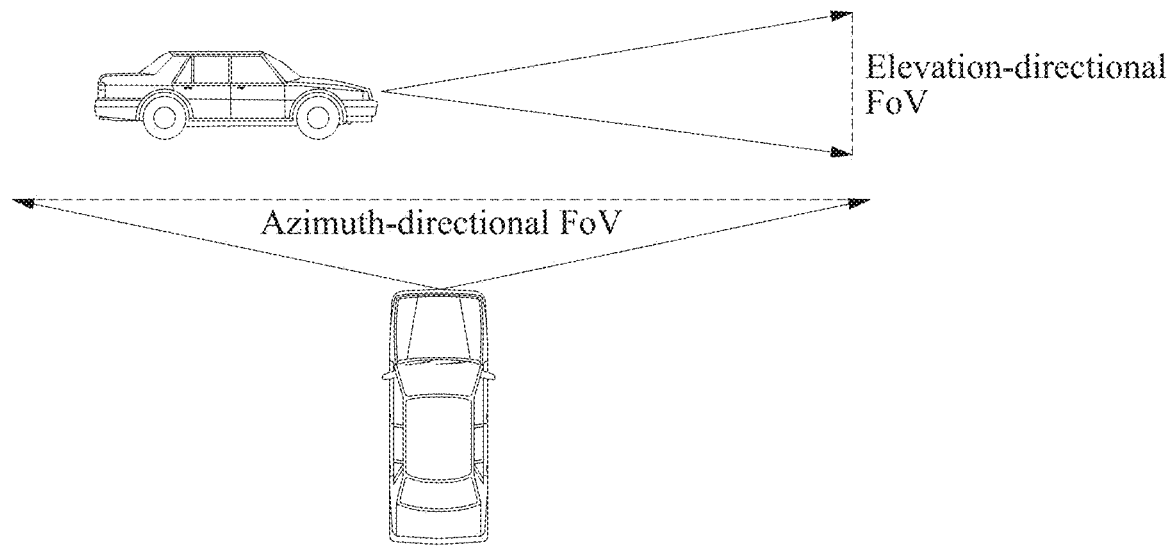
FIG. 1 illustrates an example of an operation method of a three-dimensional (3D) radar used for an autonomous vehicle control system.

Throughout the drawings and the detailed description, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

It is noted that use of the term "may" with respect to an example or embodiment, e.g., as to what an example or embodiment may include or implement, means that at least one example or embodiment exists where such a feature is included or implemented while all examples and embodiments are not limited thereto.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 illustrates an example of an operation method of a three-dimensional (3D) radar used for an autonomous vehicle control system.

Referring to FIG. 1, a 3D radar may be one of sensors important for implementing an autonomous vehicle control system. In contrast to a two-dimensional (2D) radar that generally provides 2D information, for example, azimuth direction information, associated with a distance from an object located ahead, a relative speed, and an azimuth, the 3D radar may provide 3D information including a distance from a front object, an azimuth of the front object, a relative speed of the front object, and a height of the front object. Using the 3D radar, it is possible to identify a ramp ahead or determine whether a vehicle is to pass under an overpass ahead or an obstacle in the air on a road.

Parameters indicating a performance of the 3D radar include a field of view (FoV) and a resolution of an antenna. An antenna FoV may indicate a range of an angle at which an antenna efficiently performs scanning while maintaining a property of the antenna. An antenna resolution may indicate a half power beam width (HPBW) which is an angle between two points at which a gain with respect to a maximal radiation direction of a main lobe is −3 decibels (dB) in an antenna radiation pattern.

The 3D radar transmits an electromagnetic wave forward through an antenna array and receives a reflected electromagnetic wave. The antenna array may be in a structure having a plurality of transmitting antennas and a plurality of receiving antennas, for example, a multiple-input and multiple-output (MIMO) type antenna structure. An antenna array may refer to antenna elements arranged regularly in a space. A linear antenna array may refer to an antenna array in which antenna elements are arranged in a straight line. In order to obtain a sharp directivity characteristic of one large antenna with a small antenna, a plurality of small antenna elements may be arranged and used. Generally, a radiation pattern of a single antenna element tends to spread radiation power to a wide beam, but if it is arranged using a predetermined rule, it may be used as an antenna having a directivity. The directivity may indicate a capability to concentrate an electromagnetic energy in a predetermined direction.

Directional antennas may be used for focusing radiated energy on a given FoV of interest. The 3D radar may be used in, for example, an autonomous vehicle control system to avoid obstacles represented based on sensor information.

In terms of the antenna array in the examples set forth herein, a user may determine a property, for example, a direction of a radiation pattern and a size, of the antenna array. The property of the antenna array is determined based on an arrangement method of antenna elements. For example, the user may determine a desired property of the antenna array by arranging a desired number of transmitting antenna elements and receiving antenna elements at appropriate positions. The user may form a virtual antenna element array through a control of a phase and an amplitude of an antenna element, and generate a directional radiation pattern suitable for a desired use based on the virtual antenna element array. Hereinafter, arrangements of antenna elements of an antenna array to provide elevation direction information and azimuth direction information will be described in detail with reference to FIGS. 2 through 5.

Herein, the terms "antenna array," "antenna array unit," and "antenna element" refer to hardware elements of an antenna structure configured to be controlled to generate radiation patterns. The term "antenna element" refers to an individual radiating member included in an antenna array unit and antenna array, for example.

Figure 2:
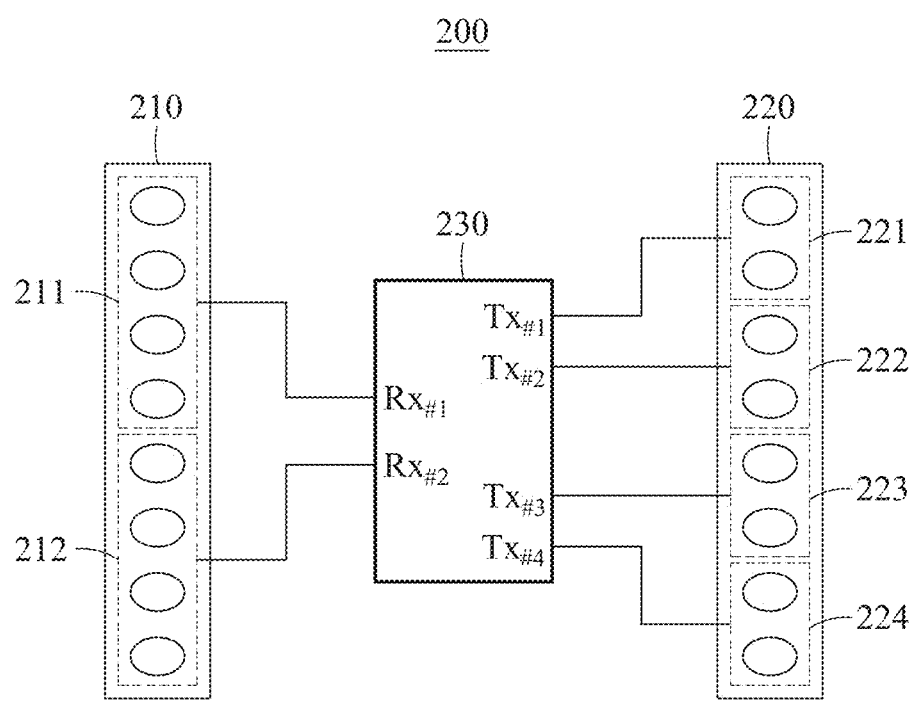
FIG. 2 illustrates an example of a structure of an antenna array.

FIG. 2 illustrates an example of a structure of an antenna array 200.

Referring to FIG. 2, the antenna array 200 includes a first antenna array 210, a second antenna array 220, and a control circuit 230.

The first antenna array includes M first antenna array units, M being a natural number. The second antenna array includes R×M second antenna array units, R being a natural number greater than or equal to 2 and indicating a predetermined ratio of a number of the second antenna array units to a number of the first antenna array units. For brevity, the following description will be made based on a case in which the first antenna array 210 includes two antenna array units, for example, first antenna array units 211 and 212 and the second antenna array 220 includes four antenna array units, for example, second antenna array units 221, 222, 223, and 224. In this case, R is 2.

An antenna array unit may be a sub-array of an antenna array. The antenna array may be easily extended through the antenna array unit. The antenna array may provide a higher resolution and/or a wide FoV through a sequential connection of antenna array units without need to redesign an antenna in comparison to a case in which one antenna unit is used.

The first antenna array unit includes 2N first antenna elements, N being a natural number. The second antenna array unit includes N second antenna elements. For brevity, the following description will be made based on a case in which each of the first antenna array units 211 and 212 includes four first antenna elements and each of the second antenna array units 221, 222, 223, and 224 includes two antenna elements.

The first antenna array units 211 and 212 and the second antenna array units 221, 222, 223, and 224 may be implemented in a form of a linear antenna array in which a plurality of antenna elements is arranged in a straight line. An antenna array may be classified as "equal-interval arrangement" in which arrangement intervals are equal and "inequal-interval arrangement" in which arrangement intervals are inequal, based on arrangement intervals between antenna elements. The first antenna array units 211 and 212 and the second antenna array units 221, 222, 223, and 224 correspond to the equal-interval arrangement in which the plurality of antenna elements are arranged at equal intervals.

The control circuit 230 may be hardware, or the control circuit 230 may include a combination of hardware and instructions that includes a processor configured to execute the instructions to perform operations and functions described herein. The control circuit 230 controls the first antenna array 210 and the second antenna array 220 to generate radiation patterns corresponding to a use. The first antenna array units 211 and 212 and the second antenna array units 221, 222, 223, and 224 are connected to corresponding independent ports of the control circuit 230. For example, the first antenna array units 211 and 212 are connected to independent ports $Rx_{\#1}$ and $Rx_{\#2}$, respectively, of the control circuit 230. Also, the second antenna array units 221, 222, 223, and 224 are connected to independent ports $Tx_{\#1}$, $Tx_{\#2}$, $Tx_{\#3}$, and $Tx_{\#4}$, respectively, of the control circuit 230. Since the antenna array 200 has a reciprocity, there is no distinction between a transmitting antenna and a receiving antenna. For example, when the first antenna array is a transmitting antenna, the second antenna array is a receiving antenna array. Conversely, when the first antenna array is a receiving antenna, the second antenna array is a transmitting antenna. An operation method of the control circuit 230 will be described in detail with reference to FIGS. 8A through 8D.

Different numbers of antenna elements may be arranged in the first antenna array units 211 and 212 and the second antenna array units 221, 222, 223, and 224. Since the number of antenna elements arranged in the first antenna array units 211 and 212 is two times larger than that of the second antenna array units 221, 222, 223, and 224, aperture sizes of the first antenna array units 211 and 212 are twice aperture sizes of the second antenna array units 221, 222, 223, and 224. Since the aperture sizes of the first antenna array units 211 and 212 are twice the aperture sizes of the second antenna array units 221, 222, 223, and 224, the antenna array may have a smallest size allowed on a vertical plane.

One first antenna array unit including 2N first antenna elements, N being a natural number, and two second antenna array units, each including N second antenna elements may generate one virtual antenna array unit. For example, the first antenna array unit 211 including the four antenna elements and the second antenna array units 221 and 222, each including the two second antenna elements, may generate one virtual antenna array unit. The virtual antenna array unit allows a lowest side lobe, a highest FoV/resolution ratio, and a minimum unit of an antenna surface. An operation of the virtual antenna array unit will be described in detail with reference to FIGS. 3 through 5.

Figure 3:
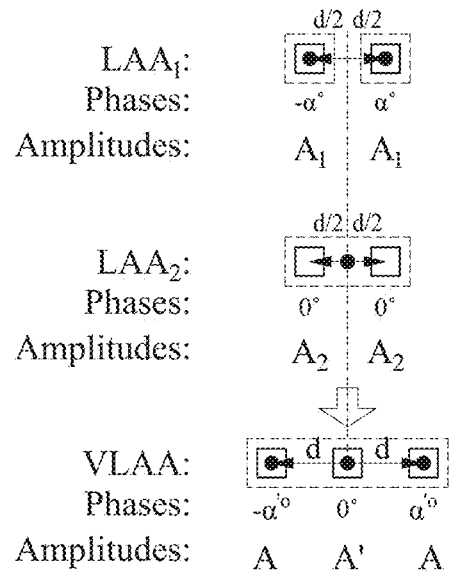
FIG. 3 illustrates an example of a virtual antenna array unit operating when n=1.

FIG. 3 illustrates an example of a virtual antenna array unit operating when n=1. In this example, and hereinafter, n is the number of first antenna elements included in one receiving antenna array unit.

Referring to FIG. 3, a receiving antenna $LAA_1$ includes two first antenna array units, each including one first antenna element. Also, a transmitting antenna $LAA_2$ includes one second antenna array unit including two second antenna elements. As described above, due to a reciprocity of an antenna, a transmitting antenna and a receiving antenna may be interchangeable. In FIG. 3, an antenna element is indicated by a square with a solid boundary and a dot represents a phase center of an antenna element of each antenna array unit.

Each of the receiving antenna $LAA_1$ and the transmitting antenna $LAA_2$ may be in a form of a linear antenna array in which antenna elements are arranged in a straight line. A phase component and an array factor (AF) of a linear antenna array in which N antenna elements are linearly arranged at equal intervals are expressed by Equation 1.

$$AF = \sum_{n=1}^{N} e^{j(n-1)\Psi}, \text{ where } \Psi = kd\cos\theta + \beta.$$ [Equation 1]

In Equation 1, d is an interval between antenna elements. According to Equation 1, an array factor of the receiving antenna $LAA_1$ and an array factor of the transmitting antenna $LAA_2$ are expressed by Equations 2 and 3.

$$LAA_1 = A_1\left(e^{-i\left(\frac{d}{2}\right)k_o(\sin\varphi - \sin\alpha)} + e^{i\left(\frac{d}{2}\right)k_o(\sin\varphi - \sin\alpha)}\right)$$ [Equation 2]

$$LAA_2 = A_2\left(e^{-i\left(\frac{d}{2}\right)k_o(\sin\varphi)} + e^{i\left(\frac{d}{2}\right)k_o(\sin\varphi)}\right)$$ [Equation 3]

Through a multiplication of lines of the receiving antenna $LAA_1$ and the transmitting antenna $LAA_2$, a virtual antenna array unit VLAA having three virtual antenna elements is obtained. An array factor of the virtual antenna array unit VLAA is expressed by Equation 4.

$$VLAA_{n=1} = LAA_1 * LAA_2 =$$
$$A\left(e^{-idk_o(\sin\varphi-\sin\alpha')} + 2\cos(dk_o\sin\alpha') + e^{idk_o(\sin\varphi-\sin\alpha')}\right),$$
$$\text{where } A = A_1A_2, \sin\alpha' = \frac{\sin\alpha}{2}$$ [Equation 4]

According to Equation 4, the virtual antenna array unit VLAA has the three virtual antenna elements, where a first virtual antenna element has a phase of $-\alpha°$ and an amplitude of $A_1A_2$, a second virtual antenna element has a phase of $0°$ and an amplitude of $$2A_1A_2\cos\left(\left(\frac{d}{2}\right)k_o\sin\alpha\right),$$

and a third virtual antenna element has a phase of $\alpha°$ and an amplitude of $A_1A_2$.

Figure 4:
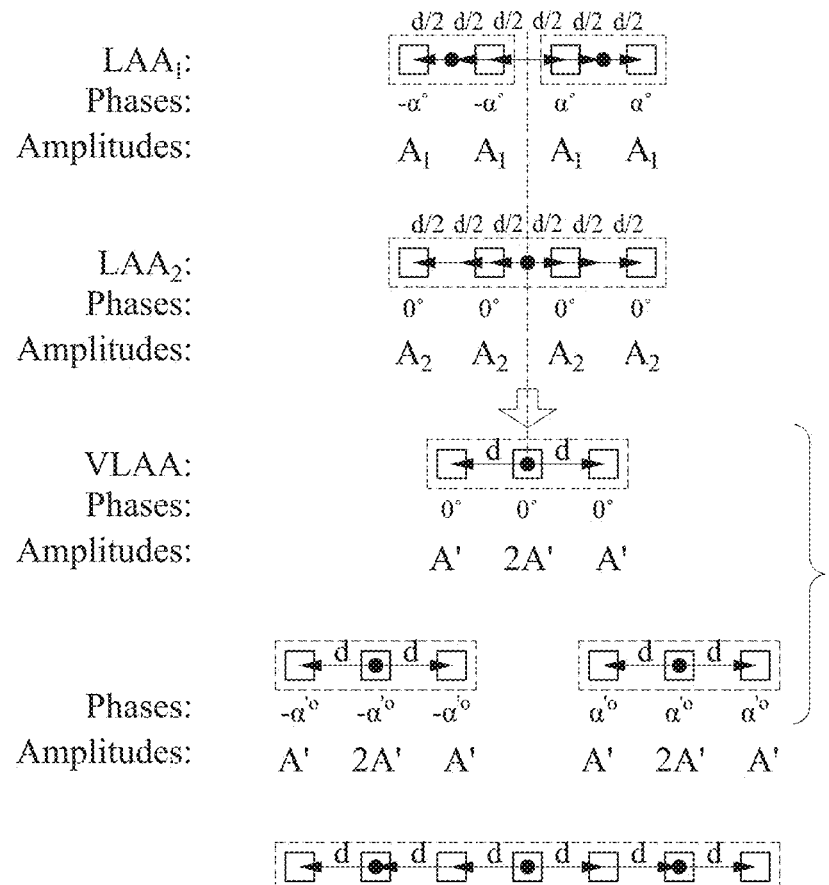
FIG. 4 illustrates an example of a virtual antenna array unit operating when n=2.

FIG. 4 illustrates an example of a virtual antenna array unit operating when n=2.

Referring to FIG. 4, a receiving antenna $LAA_1$ includes two first antenna array units, each including two first antenna elements and a transmitting antenna $LAA_2$ includes one second antenna array unit including four second antenna elements.

Using the above-described method, a virtual antenna array unit VLAA having seven virtual antenna elements is obtained. An array factor of the virtual antenna array unit is expressed by Equation 5.

$$VLAA_{n=2} = A(E^{-idk_o\sin\varphi} + 2 + e^{idk_o\sin\varphi})$$
$$\left(e^{-i2dk_o(\sin\varphi-\sin\alpha')} + 2\cos(2dk_o\sin\alpha') + e^{i2dk_o(\sin\varphi-\sin\alpha')}\right)$$
$$\text{where } A = A_1A_2, \sin\alpha' = \frac{\sin\alpha}{2}$$ [Equation 5]

Figure 5:
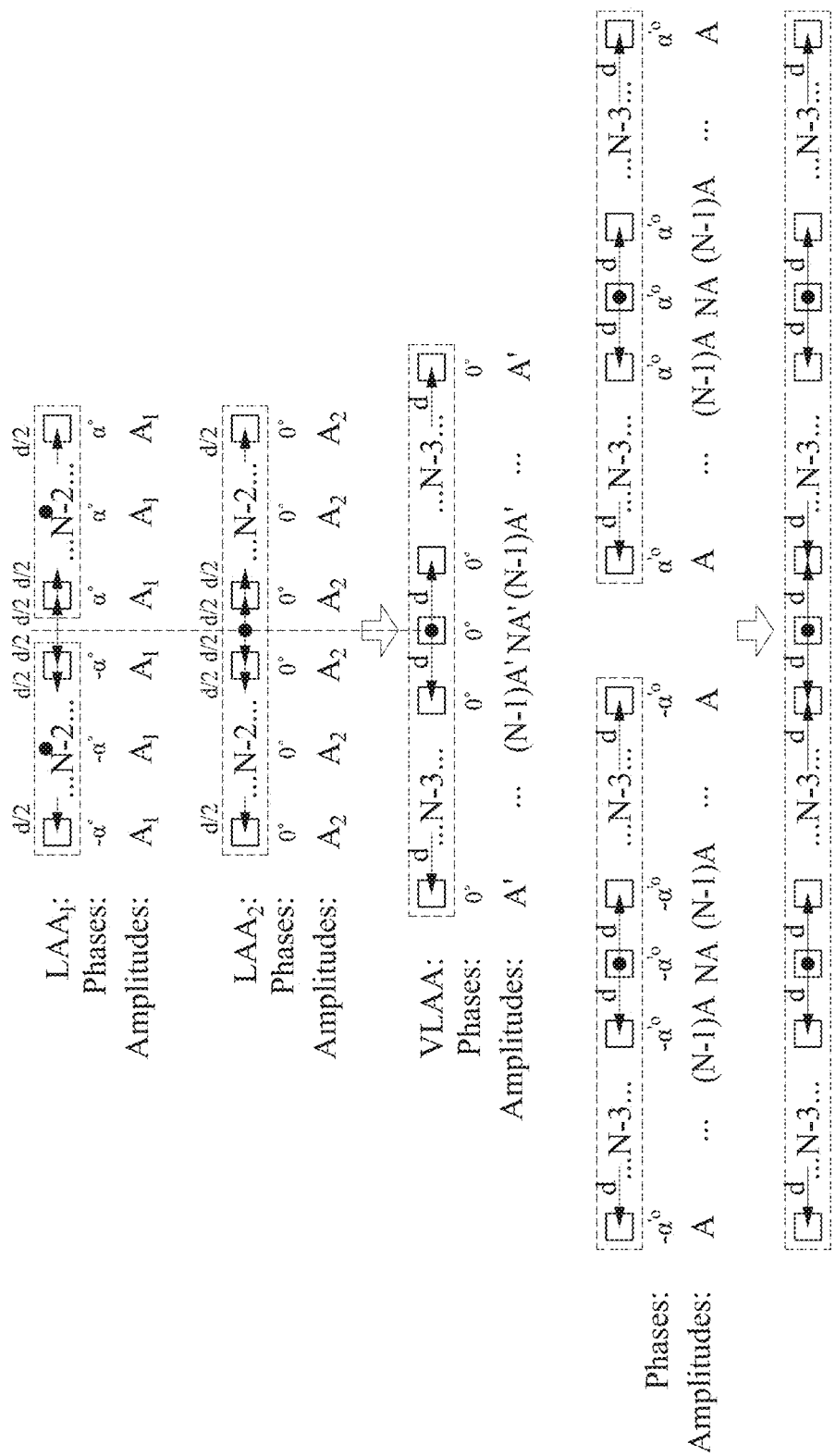
FIG. 5 illustrates an example of a virtual antenna array unit operating when n=N.

FIG. 5 illustrates an example of a virtual antenna array unit operating when n=N.

Referring to FIG. 5, a receiving antenna $LAA_1$ includes two first antenna array units, each including N first antenna elements and a transmitting antenna $LAA_2$ includes one second antenna array unit including 2N second antenna elements.

Using the above-described method, a virtual antenna array unit VLAA having (4N−1) virtual antenna elements is obtained. An array factor of the virtual antenna array unit is expressed by Equation 6.

$$VLAA_{n=N} = A\left(\sum_{n=1}^{N} e^{i\left(n-\frac{N+1}{2}\right)dk_o\sin\varphi}\right)^2$$ [Equation 6]
$$\left(e^{-iNdk_o(\sin\varphi-\sin\alpha')} + 2\cos(Ndk_o\sin\alpha') + e^{iNdk_o(\sin\varphi-\sin\alpha')}\right)$$
$$\text{where } A = A_1A_2, \sin\alpha' = \frac{\sin\alpha}{2}$$

Figure 6:
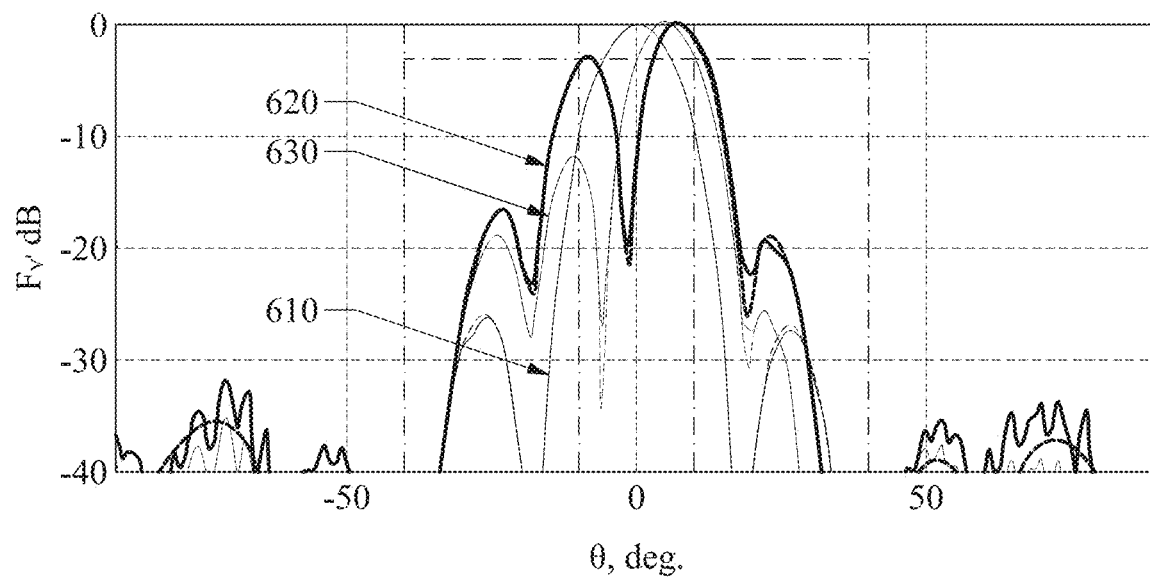
FIG. 6 illustrates an example of a radiation pattern of a virtual antenna array unit.

FIG. 6 illustrates an example of a radiation pattern of a virtual antenna array unit.

Referring to FIG. 6, a radiation pattern of a virtual antenna array unit may have forms of a pattern 610, a pattern 620, and a pattern 630 based on an $\alpha°$ phase control. For example, when a beam is not deflected and promoted in a main direction, Equation 6 may be simplified to be Equation 7. In this example, the radiation pattern is the pattern 610.

$$VLAA = \ldots (e^{\cdots - iNdk_o(\sin\varphi)} + 2 + e^{iNdk_o(\sin\varphi)})$$ [Equation 7]

In an antenna beam pattern, a target to be detected by an antenna is located in a main lobe and non-targets are located in a side lobe. A difference between greatest antenna gain values of the main lobe and the side lobe is referred to as a side low level (SLL). As the SLL increases, a difference in quantity by which an antenna array radiates electromagnetic waves to the main lobe and the side lobe increases. As a result, as the SLL increases, a larger electromagnetic wave is radiated to the main lobe in which the antenna array is located and a relatively small electromagnetic wave is radiated to the side lobe. Thus, a higher SLL is more advantageous for detection of the target to be detected by the antenna. When tapering is applied to the antenna array, the SLL increases, which may be advantageous for target detection.

According to Equation 7 and the pattern 610, the virtual antenna array unit may operate as a tapered antenna array. An element located in the middle has a largest amplitude proportional to 2N. Also, an extreme element has a smallest amplitude proportional to 1. An antenna having a radiation pattern such as the pattern 610 is used for a tracking radar used when a position of one target is to be tracked on an elevation plane.

When the beam is deflected by an angle $\alpha'°$, Equation 6 is may be simplified to be Equation 8. In this example, the radiation pattern is the pattern 620.

$$VLAA = \ldots (e^{\cdots - iNdk_o(\sin\varphi \ldots \sin\alpha')} +$$
$$1 + e^{iNdk_o(\sin\varphi \ldots \sin\alpha')})$$ [Equation 8]

According to Equation 8 and the pattern 620, the virtual antenna array unit may operate as an antenna array having 3-phase elements that provide a minimum SLL and a maximum FoV/resolution ratio.

When the beam is deflected by a greater angle than the angle $\alpha'°$, Equation 6 is may be simplified to be Equation 9. In this example, the radiation pattern is the pattern 630.

$$VLAA = \ldots (e^{\cdots - iNdk_o(\sin\varphi \ldots \sin\alpha')} + <$$
$$1 + e^{iNdk_o(\sin\varphi \ldots \sin\alpha')}$$ [Equation 9]

According to Equation 9 and the pattern 630, the virtual antenna array unit may operate as an antenna array having a significant degradation of a central element, which may lead to a significant growth of the side lobe. Thus, when the beam is deflected by a greater angle than the angle $\alpha'^\circ$, a 3D radar may not operate.

Figure 7:
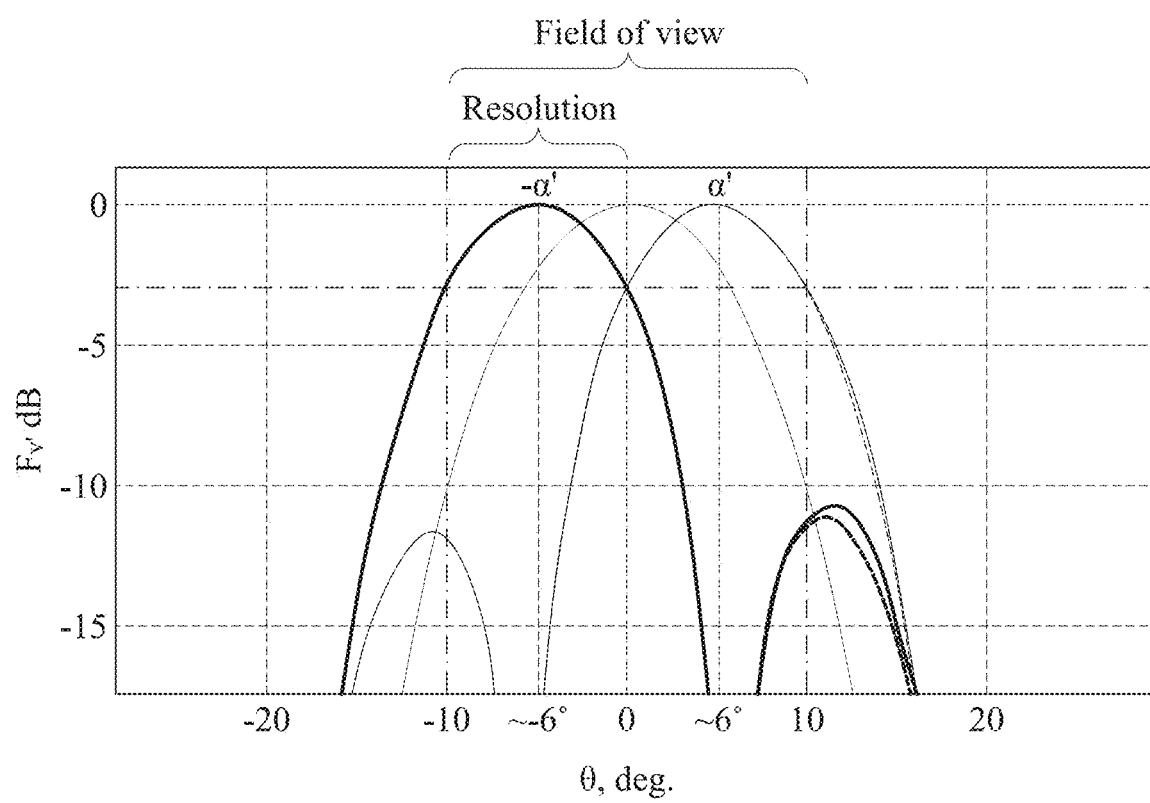
FIG. 7 illustrates an example of a radiation pattern obtained when N=3.

FIG. 7 illustrates an example of a radiation pattern obtained when N=3.

Referring to FIG. 7, when N=3, an FoV/resolution ratio is 2.

According to Equation 7 and the pattern 610, because $2\cos(Ndk_o \sin \alpha')=1$, $Ndk_o \sin \alpha'=\pi/3$ and $$\alpha' = \arcsin\left(\frac{1}{3N}\right).$$

When $$d = \frac{\lambda}{2}, \alpha' = \arcsin\left(\frac{1}{3N}\right),$$

a beamwidth is $$\theta' = \arcsin\left(\frac{\lambda}{D}\right) \to \arcsin\left(\frac{2d}{3Nd}\right) \to \arcsin\left(\frac{z}{3N}\right),$$

and the FoV/resolution ratio is 2.

When N is 1 to 4 inclusive, $\alpha'$, a resolution, and an FoV are obtained as shown in Table 1.

TABLE 1

| N | a' | Resolution | FoV |
|---|---|---|---|
| 1 | 19.4° | 40° | 80° |
| 2 | 9.6° | 20° | 40° |
| 3 | 6.0° | 12° | 24° |
| 4 | 4.8° | 9.6° | 20° |

The antenna array 200 provides simplified antenna scaling through the control circuit 230. The control circuit 230 controls the first antenna array 210 and the second antenna array 220 to generate radiation patterns corresponding to a use. An antenna array unit is a sub-array of the antenna array. The antenna array may be easily extended through a connection of antenna array units by the control circuit 230.

One first antenna array unit including 2N first antenna elements, N being a natural number, and two second antenna array units, each including N second antenna elements may generate one virtual antenna array unit. Through a sequential combination with the one virtual antenna array unit, a user may obtain desired FoV and resolution on a vertical plane while a feature of a virtually tapered virtual antenna array unit corresponding to N=1 is maintained. Instead of designing a new antenna satisfying a set requirement to provide a higher resolution and/or a wider FoV, it is possible to obtain appropriate resolution and FoV by sequentially combining virtual antenna array units through a sequential connection of antenna array units.

The antenna array 200 controls the connection of the antenna array units through the control circuit 230, thereby providing a multi-mode radar in one device without need to design a new antenna. For example, using an antenna array implemented as one printed circuit board (PCB), it is possible to provide a mode for use through a phase connection and a power on/off control of the antenna array units.

The control circuit 230 controls a phase and an amplitude suitable for forming a virtual antenna array that generates a radiation pattern having a resolution and a beam deflection for use. A calculation required for the control may be performed based on an antenna array theory. The control circuit 230 generates an appropriate radiation pattern for use through an on-off control of an independent port. Also, the control circuit 230 generates an appropriate radiation pattern for use through an in-phase connection control of an independent port. A method of generating the radiation pattern for use will be described in detail with reference to FIGS. 8A through 8D.

FIGS. 8A through 8D illustrate examples of a radiation pattern generated through a connection control of the antenna array of FIG. 2 and a control method corresponding to the radiation pattern.

Figure 8A:
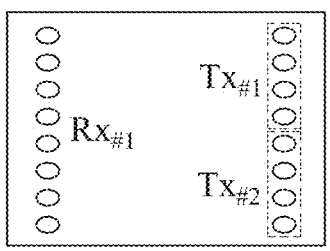
FIGS. 8A through 8D illustrate examples of a radiation pattern generated through a connection control of the antenna array of FIG. 2 and a control method corresponding to the radiation pattern.
Figure 8A:
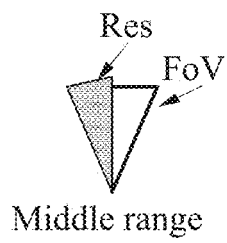
Figure 8A:
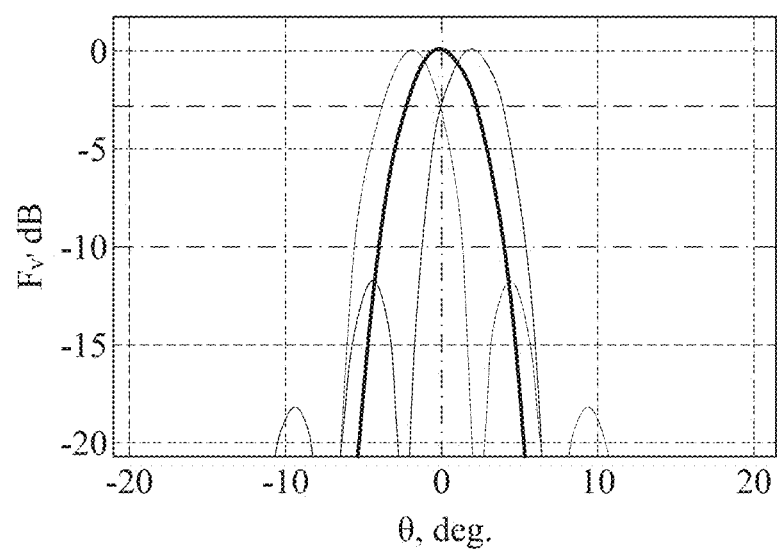

FIG. 8A illustrates an antenna array including a first antenna array configured with one first antenna array unit including eight first antenna elements, and a second antenna array configured with two second antenna array units, each including four second antenna elements. The first antenna array and the second antenna array may be a transmitting antenna and a receiving antenna, respectively, or a receiving antenna and a transmitting antenna, respectively.

Referring to FIG. 8A, the antenna array corresponds to a case in which N is 2 in Table 1. Also, since an FoV/resolution ratio is 2 and an antenna gain is relatively high, the antenna array is suitable for use as a middle-range radar. To generate a radiation pattern of FIG. 8A, the control circuit 230 controls Rx #1 and Rx #2, Tx #1 and Tx #2, and Tx #3 and Tx #4 to be in-phase. Through this, the one first antenna array unit and the two second antenna array units may generate one virtual antenna array unit that generates a radiation pattern suitable for the middle-range radar.

Figure 8B:
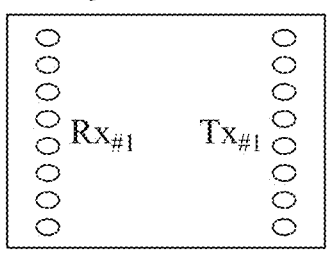
Figure 8B:
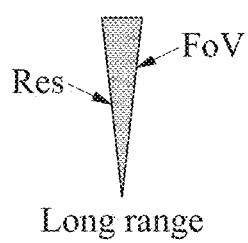
Figure 8B:
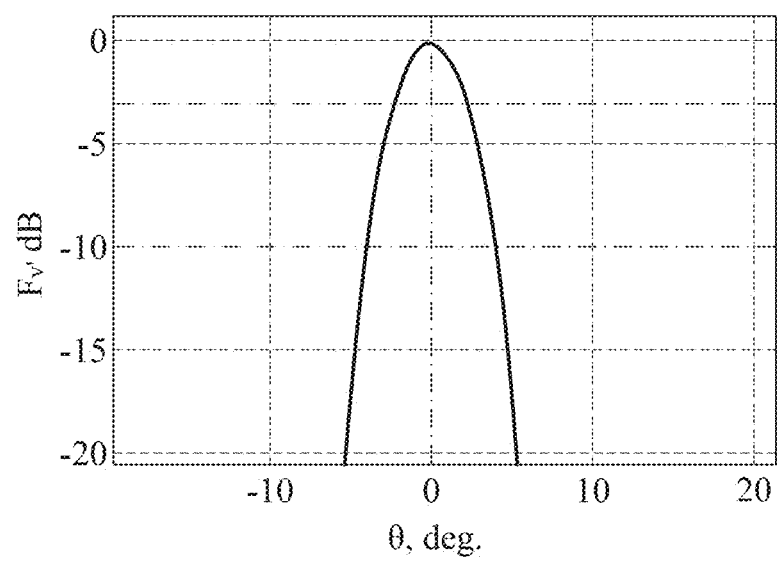

FIG. 8B illustrates an antenna array including a first antenna array configured with one first antenna array unit including eight first antenna elements, and a second antenna array configured with one second antenna array unit including eight second antenna elements. The first antenna array and the second antenna array may be respectively a transmitting antenna (or a receiving antenna) and a receiving antenna (or a transmitting antenna).

Referring to FIG. 8B, since an FoV/resolution ratio is 1, the antenna array is unsuitable for use of object scanning. Also, because an antenna gain is relatively high, the antenna array is suitable for use as a long-range radar for tracking a target. To generate a radiation pattern of FIG. 8B, the control circuit 230 controls Rx #1 and Rx #2, Tx #1, Tx #2, Tx #3 and Tx #4 to be in-phase. Through this, the one first antenna array unit and the one second antenna array unit may generate one virtual antenna array unit that generates a radiation pattern suitable for the long-range radar.

Figure 8C:
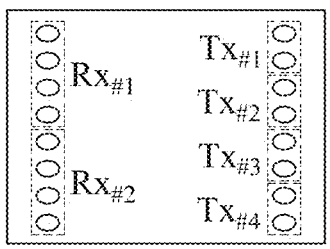
Figure 8C:
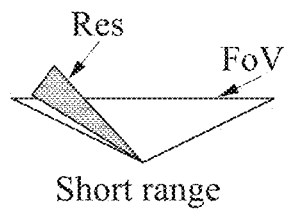
Figure 8C:
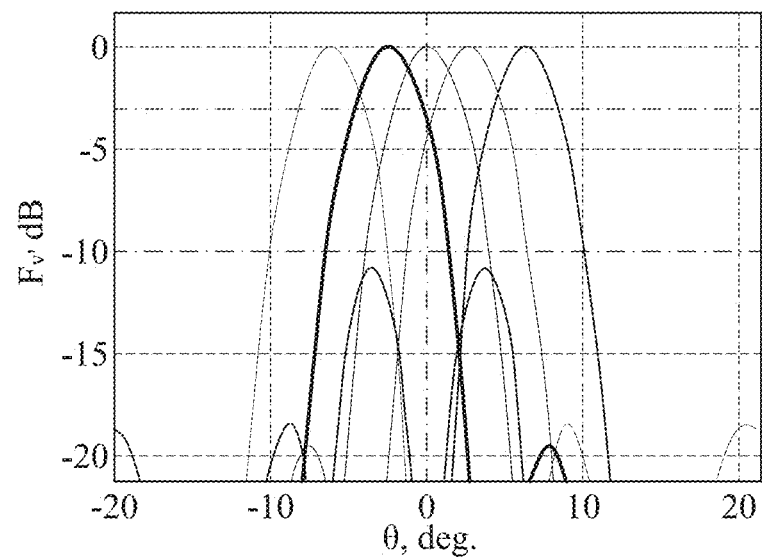

FIG. 8C illustrates an antenna array including a first antenna array configured with two first antenna array units, each including four first antenna elements and a second antenna array configured with four second antenna array units, each including two second antenna elements. The first antenna array and the second antenna array may be a transmitting antenna and a receiving antenna, respectively, or a receiving antenna and a transmitting antenna, respectively.

Referring to FIG. 8C, since an FoV/resolution ratio is relatively large and an antenna gain is relatively low, the antenna array is suitable for use as a short-range radar. To generate a radiation pattern of FIG. 8C, the control circuit 230 controls all independent ports to be on. Through this, the two first antenna array units and the four second antenna array units may generate two virtual antenna array units that generate a radiation pattern suitable for the short-range radar.

Referring to FIGS. 8A through 8C, each of the antenna arrays uses all of the antenna array units, that is, the eight first antenna elements and the eight second antenna elements, and has the same resolution.

Figure 8D:
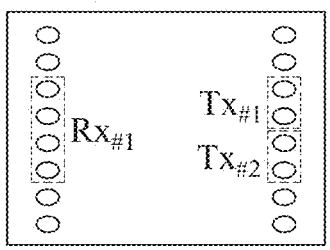
Figure 8D:
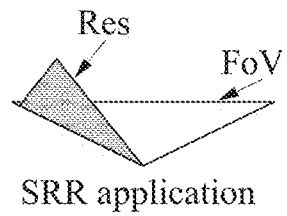
Figure 8D:
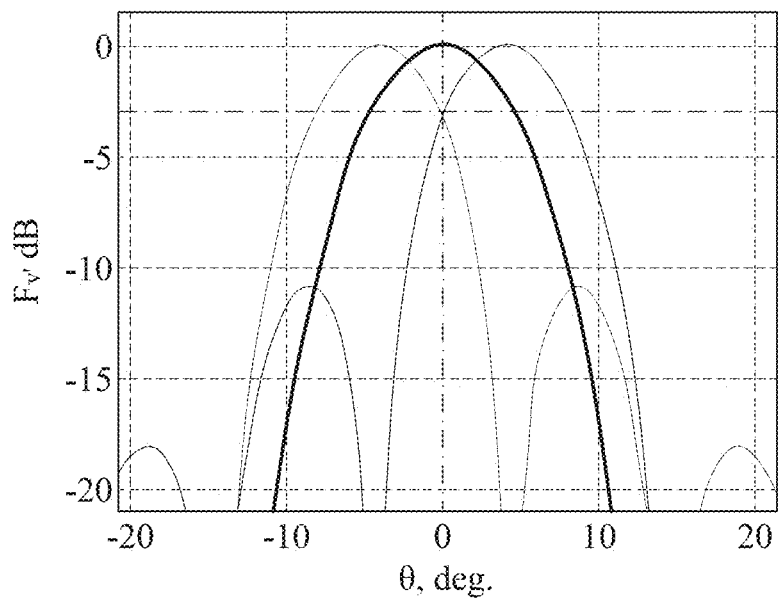

FIG. 8D illustrates an antenna array including a first antenna array configured with one first antenna array unit including four first antenna elements and a second antenna array configured with two second antenna array units, each including two second antenna elements. Four remaining first antenna elements of the first antenna array and four remaining second antenna elements of the second antenna array may not be used. The first antenna array and the second antenna array may be a transmitting antenna and a receiving antenna, respectively, or a receiving antenna and a transmitting antenna, respectively.

Referring to FIG. 8D, like the antenna array of FIG. 8C, since an FoV/resolution ratio is relatively large and an antenna gain is relatively low, the antenna array is suitable for use as the short-range radar. Also, since a resolution of the antenna array of FIG. 8D increases compared to the antenna array of FIG. 8C, the FoV/resolution ratio of the antenna array of FIG. 8D may be slightly smaller than the FoV/resolution ratio of the antenna array of FIG. 8C.

To generate a radiation pattern of FIG. 8D, the control circuit 230 controls Rx #1 to be on, Rx #2 to be off, Tx #1 and Tx #2 to be on, and Tx #3 and Tx #4 to be off (or, conversely, Rx #1 to be off, Rx #2 to be on, Tx #1 and Tx #2 to be off, and Tx #3 and Tx #4 to be on). Through this, the one first antenna array unit and the two second antenna array units may generate one virtual antenna array unit that generates a radiation pattern suitable for the short-range radar.

Figure 9:
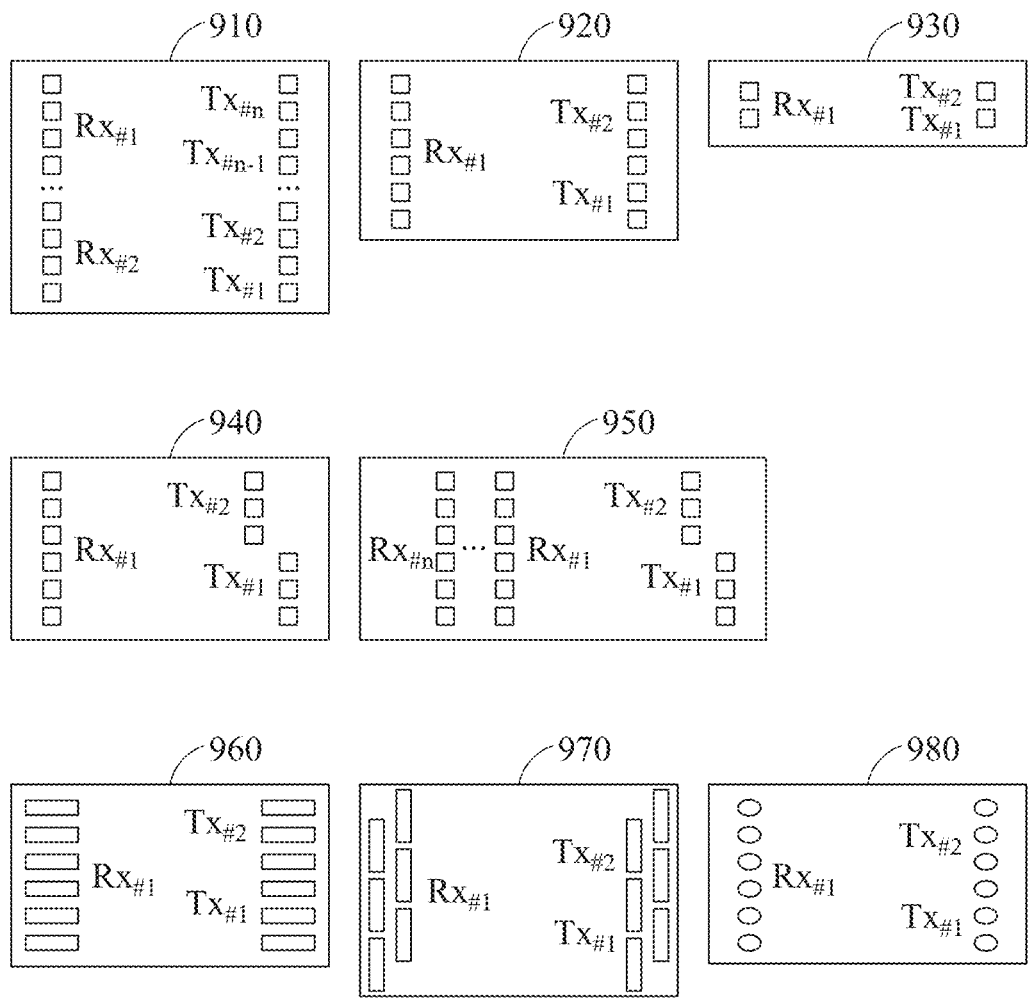
FIG. 9 illustrates an example of various antenna array forms for generating a virtual antenna array.

FIG. 9 illustrates an example of various antenna array forms for generating a virtual antenna array.

Referring to FIG. 9, as well as the antenna array 200, any type of array antenna that includes M first antenna array units, each including 2N first antenna elements, N being a natural number and 2M second antenna array unit, each including N second antenna elements may generate a virtual antenna array. For example, antenna arrays 910, 920, 930, 940, 950, 960, 970, and 980 satisfy the aforementioned condition and thus, may generate a virtual antenna array.

A first antenna array unit and a second antenna array unit include monopole antennas. First antenna elements and second antenna elements are formed on a PCB. When the first antenna elements and the second antenna elements are formed on the PCB, a size of patch does not need to be reduced for array edges of an elevation plane for application. Each of the first antenna elements and the second antenna elements may be formed as a patch (e.g., a rectangular patch, a square patch, or a round patch), or a slot. The antenna array may be used in combination with a typical MIMO configuration for implementing a 3D radar. Also, the first antenna array units and the second antenna array units are arranged in an elevation direction to perform elevation-directional scanning.

FIGS. 10 through 12B illustrate examples of experiments related to a performance of an antenna array.

Figure 10:
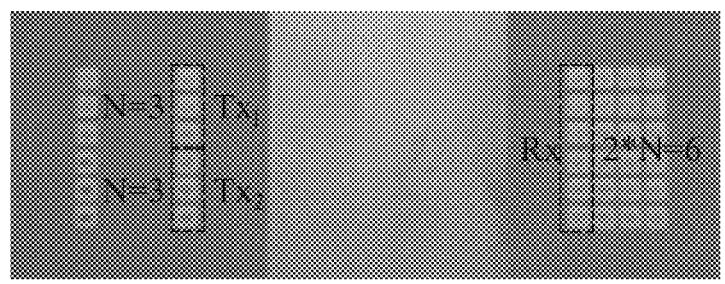
FIGS. 10 through 12B illustrate examples of an experiment related to a performance of an antenna array.

FIG. 10 illustrates an experimental antenna array sample. The experimental antenna array sample includes a first antenna array configured with one first antenna array unit including six first antenna elements and a second antenna array configured with two second antenna units, each including three second antenna elements.

Figure 11A:
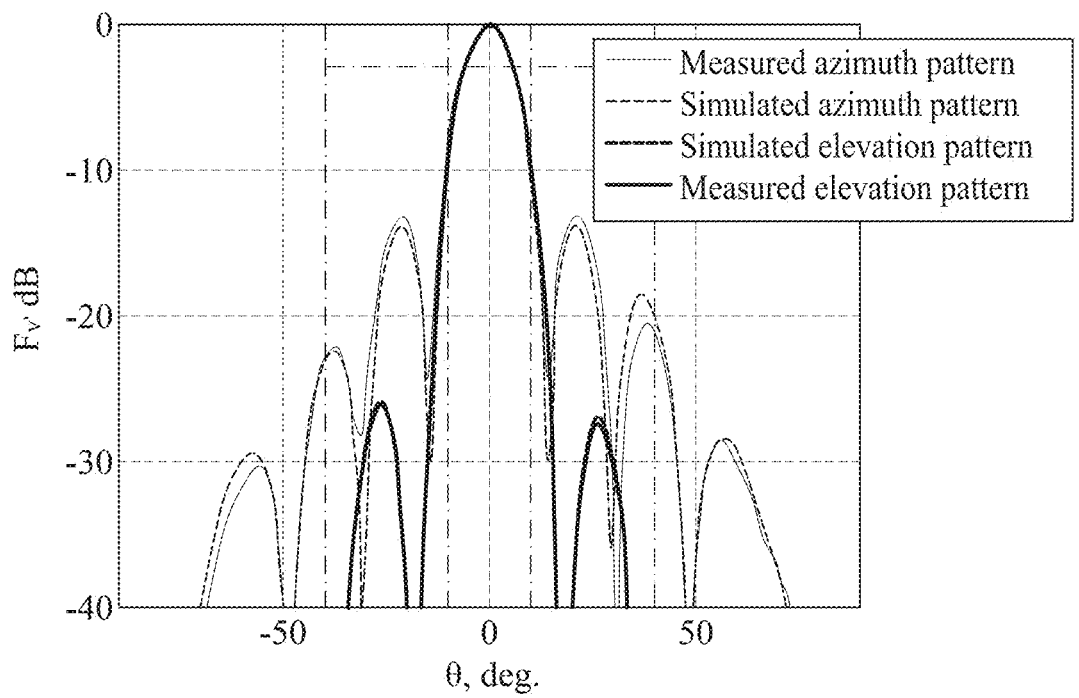
Figure 11B:
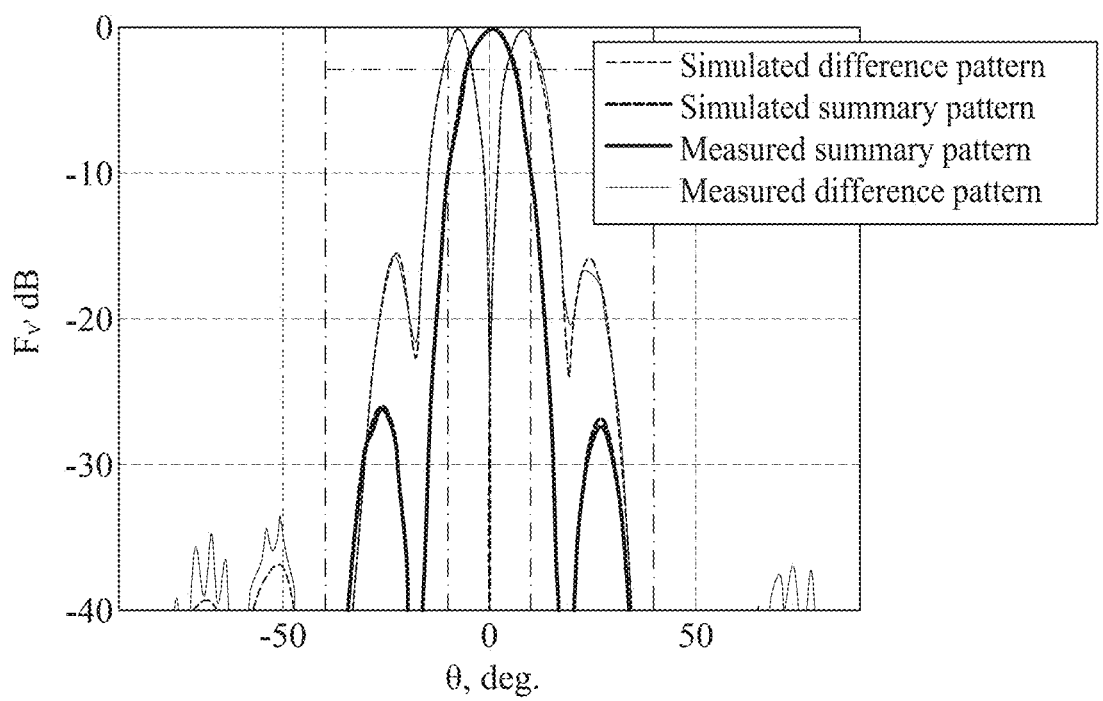
Figure 11C:
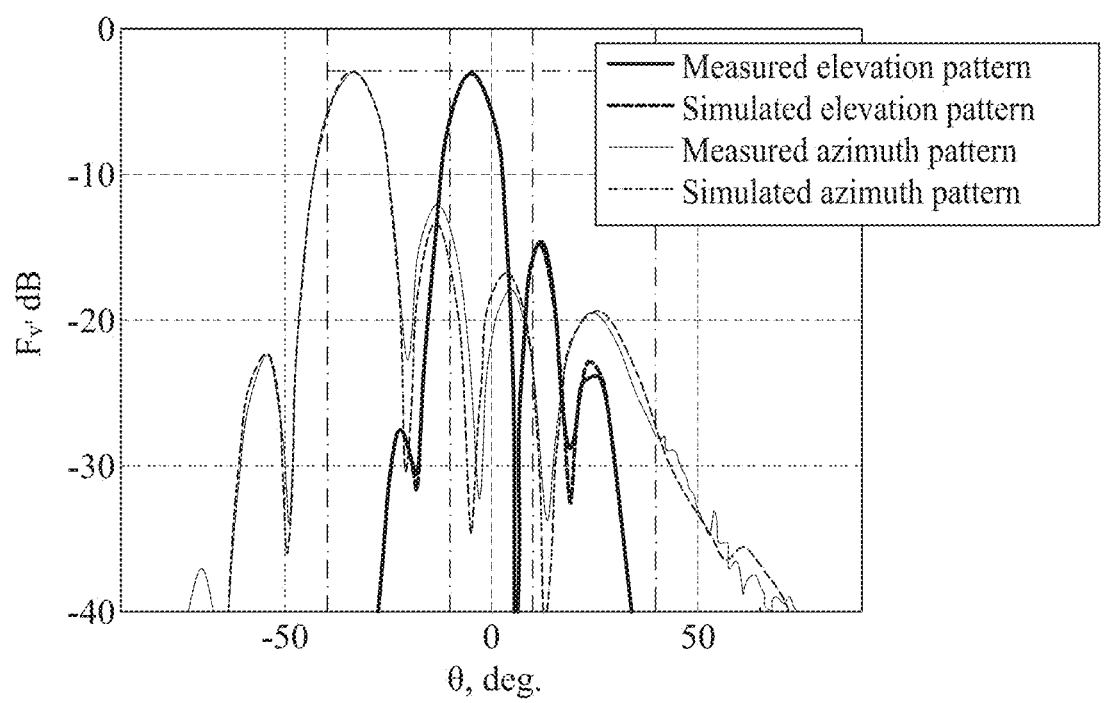

An experimental result of the antenna array sample of FIG. 10 is shown in FIG. 11A (summary radiation pattern, 79 GHz, main direction), FIG. 11B (summary and difference radiation patterns on radar plane, 79 GHz, for tracking radar), and FIG. 11C (beamforming on azimuth plane and elevation plane for 3D radar, 79 GHz, for 3D radar).

The antenna array may be used for both tracking radar and 3D radar. In terms of the tracking radar, a side lobe level is −27 dB. In terms of the 3D radar, a side lobe level within an FoV does not exceed −10 dB on the elevation plane due to realizing of a special ratio between apertures of receiving and transmitting antennas.

Also, during the experiments, a resolution capability, which is an ability to distinguish between different objects located within a field of view, of a proposed antenna was verified. For example, when two objects are located in a main beam area, the objects may be considered by the radar as the same object. When a beam is scanned, only one of the objects may appear in a beam area at a certain point in time, and the second one may become "invisible" to the radar, and vice versa.

Figure 12A:
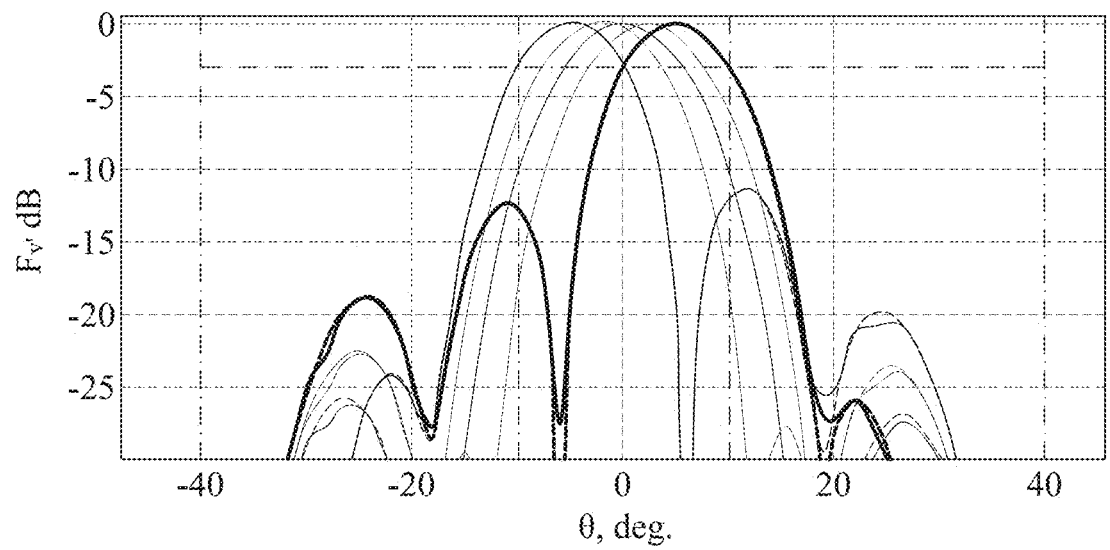
Figure 12B:
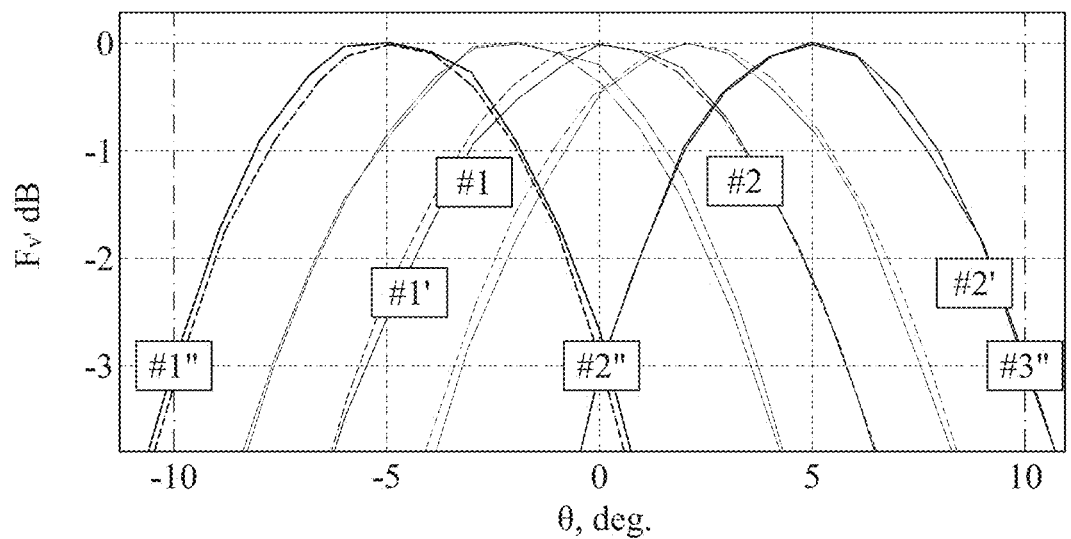

FIGS. 12A and 12B illustrate antenna patterns obtained during scanning. For example, five positions in a main direction at −5°, −2.5°, 0°, 2.5°, and 5° are indicated. Also, FIG. 12B shows an upper part of the chart from a level of 0 dB to −3 dB, within which a performance of the radar to detect different objects was tested.

The tests were carried out for 3 situations: 1) objects #1 and #2 were located near each other at a distance of less than 10° from a point of view of the radar; 2) objects #1 and #2 were relatively far from each other at a distance of more than 10° from the point of view of the radar; and 3) objects #1, #2 and #3 were located at points of −10°, 0° and 10° from the point of view of the radar.

The test results are shown in Table 2.

TABLE 2

| Situation | Main beam direction | | | | |
|---|---|---|---|---|---|
| | −5° | −2.5° | 0° | 2.5° | 5° |
| 1) 2 objects close | 1 | 2 | 2 | 2 | 1 |
| 2) 2 objects away | 1 | 1 | 1 | — | 1 |
| 3) 3 objects | 2 | 1 | 1 | 1 | 2 |

As can be seen from Table 2 and from FIG. 12B, in scanning, there are moments when the radar detected two objects, only one of the objects, and none of the objects. In a first case, the radar did not separate two objects. In a second case, the radar separated two objects located at a distance greater than or equal to a radar resolution. In a third case, the radar separated three objects.

An operation method of an antenna array includes, for example, an operation of receiving a user input (not shown) and an operation, hereinafter referred to as "controlling operation", of controlling a first antenna array and a second antenna array such that a radiation pattern corresponding to the input is generated. The first antenna array includes M first antenna array units, M being a natural number. The second antenna array includes 2M second antenna array units. The first antenna array unit includes 2N antenna elements, N being a natural number. The second antenna array unit includes N antenna elements.

Each of the first antenna array unit and the second antenna array unit is connected to a corresponding independent port of a control circuit. The controlling operation includes an operation of controlling on-off states of the independent port based on the input and an operation of controlling an in-phase connection of the independent port based on the input.

The controlling operation includes an operation of generating a virtual antenna array unit tapered by controlling the first antenna array unit and the second antenna array unit.

In each of the first antenna array and the second antenna array, distances between antenna elements are the same. That is, distances between adjacent first antenna elements in the first antenna array may be equal to one another, and distances between adjacent second antenna elements in the second antenna array may be equal to one another. Additionally, the distances between adjacent first antenna elements and the distances between the adjacent second antenna elements may be equal to one another.

The antenna array may be used as a multi-mode 3D radar, for example, for automotive navigation, driver assistance, autonomous driving, robot navigation, and many other suitable applications. In particular, in a case of using the radar to control a service robot such as a health care robot, a cooking robot, and the like, navigation may be based on a 3D radar-scanned map of a surrounding space. In a case of using the radar to help a driver or autonomous driving, a faster lane may be detected by 3D scanning for obstacles and moving cars, and the driver may be notified with an active feedback such as sound, display, head-up display or steering. In addition, in a case of autonomous driving, it is possible to increase a radar resolution with a limited number of available transmitters and receivers and use the same device for different applications.

The control circuit 230 in FIG. 1 that performs the operations described in this application is implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3-8D, and 11A through 12B that perform the operations described in this application may be performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD–Rs, CD+Rs, CD–RWs, CD+RWs, DVD-ROMs, DVD–Rs, DVD+Rs, DVD--RWs, DVD+ RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An antenna array, comprising:
   a first antenna array comprising M first antenna subset array units, M being a natural number, a first antenna subset array unit, of the M first antenna subset array units, corresponding to a subset of the first antenna array;
   a second antenna array comprising R×M second antenna subset array units, R being a natural number greater than or equal to 2, a second antenna subset array unit, of the R×M second antenna subset array units, corresponding to a subset of the second antenna array; and
   a control circuit configured to control the first antenna array and the second antenna array to generate radiation patterns,
   wherein each of the first antenna subset array units comprises R×N first antenna elements, N being a natural number,
   wherein each of the second antenna subset array units comprises N second antenna elements, and
   wherein a number of first antenna elements included in the first antenna array is equal to a number of second antenna elements included in the second antenna array.

2. The antenna array of claim 1, wherein each of the first antenna subset array units and the second antenna subset array units is connected to a corresponding independent port of the control circuit.

3. The antenna array of claim 2, wherein the control circuit is further configured to generate the radiation patterns through respective on-off control of independent ports of the control circuit.

4. The antenna array of claim 2, wherein the control circuit is further configured to generate the radiation patterns through respective in-phase connection control of independent ports of the control circuit.

5. The antenna array of claim 1, wherein the control circuit is further configured to control one first antenna subset array unit, among the first antenna subset array units, and two second antenna subset array units, among the second antenna subset array units, to generate a tapered virtual antenna array unit.

6. The antenna array of claim 5, wherein R is 2, and the virtual antenna array unit comprises 4N−1 virtual antenna elements.

7. The antenna array of claim 1, wherein aperture sizes of the first antenna subset array units are twice aperture sizes of the second antenna subset array units.

8. The antenna array of claim 1, wherein distances between adjacent first antenna elements, among the first antenna elements, are equal to one another, and distances between adjacent second antenna elements, among the second antenna elements, are equal to one another.

9. The antenna array of claim 1, wherein the first antenna subset array units and the second antenna subset array units comprise monopole antennas.

10. The antenna array of claim 1, wherein one of the first antenna array and the second antenna array is a transmitting antenna, and the other of the first antenna array and the second antenna array is a receiving antenna.

11. The antenna array of claim 1, wherein each of the first antenna elements and the second antenna elements is disposed on a printed circuit board (PCB).

12. The antenna array of claim 1, wherein each of the first antenna elements and the second antenna elements is formed as a patch or a slot.

13. The antenna array of claim 1, wherein the first antenna subset array units and the second antenna subset array units are arranged in linear antenna arrays.

14. The antenna array of claim 1, wherein the first antenna subset array units and a second antenna subset array units are arranged in an elevation direction to perform elevation-directional scanning.

15. An operation method of an antenna array, the operation method comprising:
   receiving a user input; and
   controlling a first antenna array and a second antenna array to generate radiation patterns corresponding to the user input,
   wherein
      the first antenna array comprises M first antenna subset array units, M being a natural number, a first antenna subset array unit, of the M first antenna subset array units, corresponding to a subset of the first antenna array,
      the second antenna array comprises R×M second antenna subset array units, R being a natural number greater than or equal to 2, a second antenna subset array unit, of the R×M second antenna subset array units, corresponding to a subset of the second antenna array,
      each of the first antenna subset array units comprises R×N first antenna elements, N being a natural number, each of the second antenna subset array units comprises N second antenna elements, and a number of first antenna elements included in the first antenna array is equal to a number of second antenna elements included in the second antenna array.

16. The operation method of claim 15, wherein each of the first antenna subset array units and the second antenna subset array units is connected to a corresponding independent port of a control circuit, and wherein the controlling comprises controlling on-off operation states of the independent port based on the input, and controlling an in-phase connection of the independent port based on the input.

17. The operation method of claim 15, wherein the controlling comprises:

generating a tapered virtual antenna array by controlling the first antenna array and the second antenna array.

18. The operation method of claim 15, wherein distances between adjacent first antenna elements, among the first antenna elements, are equal to one another, and distances between adjacent second antenna elements, among the second antenna elements, are equal to one another.

19. A non-transitory computer-readable storage medium storing instructions that, when executed by a processor, cause the processor to perform the operation method of claim 15.

* * * * *